(12) United States Patent
Park et al.

(10) Patent No.: US 8,389,628 B2
(45) Date of Patent: *Mar. 5, 2013

(54) HIGH FLOW THERMOPLASTIC RESIN COMPOSITION WITH EXCELLENT CHEMICAL RESISTANCE, IMPACT RESISTANCE AND GLOSS

(75) Inventors: Jee Kwon Park, Uiwang-si (KR); Jin Hwan Choi, Uiwang-si (KR); Kang Yeol Park, Uiwang-si (KR); Jun Myung Kim, Uiwang-si (KR); Jae Won Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,601

(22) Filed: Dec. 28, 2009

(65) Prior Publication Data

US 2010/0168315 A1 Jul. 1, 2010

(51) Int. Cl.
*C08L 9/06* (2006.01)
*C08L 67/02* (2006.01)

(52) U.S. Cl. .................. 525/74; 525/77; 525/78; 525/79

(58) Field of Classification Search .................. None
See application file for complete search history.

(56) References Cited

U.S. PATENT DOCUMENTS

| | | | |
|---|---|---|---|
| 4,027,073 A | 5/1977 | Clark | |
| 4,585,818 A | 4/1986 | Jung et al. | |
| 4,994,515 A | 2/1991 | Washiyama et al. | |
| 5,039,729 A | 8/1991 | Brackenridge et al. | |
| 5,055,235 A | 10/1991 | Brackenridge et al. | |
| 5,290,855 A | 3/1994 | Kodama et al. | |
| 5,635,565 A | 6/1997 | Miyajima et al. | |
| 5,712,336 A | 1/1998 | Gareiss et al. | |
| 5,989,723 A | 11/1999 | Tsai et al. | |
| 6,117,371 A | 9/2000 | Mack | |
| 6,447,913 B1 | 9/2002 | Watanabe et al. | |
| 7,288,587 B2 | 10/2007 | Saitou et al. | |
| 2001/0041772 A1 | 11/2001 | Masubuchi et al. | |
| 2005/0137311 A1 | 6/2005 | Muylem et al. | |
| 2007/0049674 A1 | 3/2007 | Kim et al. | |
| 2008/0088961 A1 | 4/2008 | Kushida | |
| 2008/0160240 A1 | 7/2008 | Son et al. | |
| 2008/0221255 A1 | 9/2008 | Ahn et al. | |
| 2010/0029828 A1 | 2/2010 | Ahn et al. | |
| 2010/0041800 A1 | 2/2010 | Son et al. | |
| 2010/0113648 A1* | 5/2010 | Niessner et al. ............. | 523/351 |
| 2010/0152342 A1 | 6/2010 | Kong et al. | |
| 2010/0152372 A1 | 6/2010 | Oh et al. | |
| 2010/0168292 A1 | 7/2010 | Son et al. | |
| 2010/0249314 A1 | 9/2010 | Park et al. | |
| 2011/0160343 A1 | 6/2011 | Son et al. | |

FOREIGN PATENT DOCUMENTS

| | | | |
|---|---|---|---|
| EP | 0347116 A2 | | 12/1989 |
| EP | 0489912 A1 | | 6/1992 |
| EP | 0502333 A1 | | 9/1992 |
| JP | 1-163243 A | * | 6/1989 |
| JP | 01-263149 A | | 10/1989 |
| JP | 01-304153 A | | 12/1989 |
| JP | 05-295196 A | | 11/1993 |
| JP | 05-339479 A | | 12/1993 |
| JP | 06-322200 A | | 11/1994 |
| JP | 08-311300 A | | 11/1996 |
| JP | 10-175893 | | 6/1998 |
| JP | 2001-139742 | | 5/2001 |
| JP | 2002-97374 A | | 4/2002 |
| JP | 2005-272640 | | 10/2005 |
| JP | 2006-111787 A | | 4/2006 |
| JP | 2006-143955 | | 6/2006 |
| JP | 2006-143955 A | * | 6/2006 |
| JP | 2007-314619 | | 12/2007 |
| KR | 910008803 B1 | | 10/1991 |
| KR | 10-1994-0000552 A | | 1/1994 |
| KR | 97-0006164 B1 | | 4/1997 |
| KR | 159256 B1 | | 1/1999 |
| KR | 2003-0056039 A | | 7/2003 |
| KR | 10-2004-0022374 A | | 3/2004 |
| KR | 2004-0079118 A | | 9/2004 |
| WO | 90/15103 A1 | | 12/1990 |
| WO | 92/00351 A1 | | 1/1992 |
| WO | 2008/082138 A1 | | 7/2008 |
| WO | WO 2009/084808 A1 | * | 7/2009 |

OTHER PUBLICATIONS

Machine Translation of JP 2005-272640A, downloaded from http://www19.ipdl.inpit.go.jp/PA1/cgi-bin/PA1DETAIL, Jun. 23, 2009, pp. 1-13.
Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3, 2009.
BASF, Joncryl ADR-4370-S, Mar. 13, 2007, pp. 1-9.
Villalobos et al., "Oligomeric chain extenders for economic reprocessing and recycling of condensation plastics," ScineceDirect, Energy 31, 2006, pp. 3227-3234.

* cited by examiner

*Primary Examiner* — Robert Sellers
(74) *Attorney, Agent, or Firm* — Summa, Additon & Ashe, P.A.

(57) ABSTRACT

The present invention provides a thermoplastic resin composition that can have excellent impact resistance, chemical resistance, fluidity and high gloss, which comprises about 1 to about 80 parts by weight of a styrene-acrylonitrile resin (A) including one or more functional groups capable of reacting with polyester; about 1 to about 98 parts by weight of an acrylonitrile-butadiene-styrene resin (B) including about 5 to about 40% by weight of a graft polymerized acrylonitrile-butadiene-styrene resin (B1) and about 60 to about 95% by weight of a styrene-acrylonitrile resin (B2) and including about 20% by weight or less of acrylonitrile; and about 1 to about 98 parts by weight of a polyester resin (C), wherein the resin composition comprises acrylonitrile in a total amount of about 1 to about 13% by weight.

8 Claims, 1 Drawing Sheet

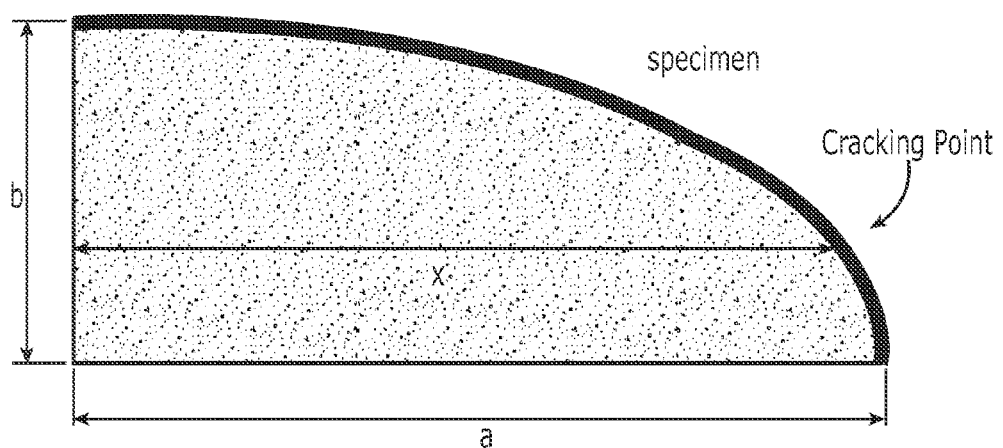

HIGH FLOW THERMOPLASTIC RESIN COMPOSITION WITH EXCELLENT CHEMICAL RESISTANCE, IMPACT RESISTANCE AND GLOSS

CROSS REFERENCE TO RELATED APPLICATIONS

This application claims priority from Korean Patent Application No. 2008-137028 filed on Dec. 30, 2008 in the Korean Intellectual Property Office, the disclosure of which is incorporated herein by reference in its entirety.

FIELD OF THE INVENTION

The present invention relates to a high flow thermoplastic resin composition with excellent chemical resistance, impact resistance and gloss.

BACKGROUND OF THE INVENTION

Acrylonitrile-butadiene-styrene copolymer (ABS) resins are prepared by dispersing a graft ABS copolymer (g-ABS) resin into a matrix polymer of a styrene-acrylonitrile copolymer (SAN) resin. The graft ABS copolymer (g-ABS) is a copolymer in which aromatic vinyl compounds (such as styrene monomers) and unsaturated nitrile-based compounds (such as acrylonitrile monomers) are grafted to a butadiene-based rubber polymer as central or core portion. Such ABS resins can have excellent properties, such as workability, impact resistance, strength, melt strength and the like, and also can have excellent coloring properties and gloss. Accordingly, ABS resins are widely used in various electric, electronic and miscellaneous components requiring an aesthetically pleasing external appearance.

However, ABS resins should also have resistance against strong chemicals such as acetic acid and industrial oils without cracking while maintaining excellent impact resistance when used in interior and exterior materials of electric and electronic appliances such as mixers, washing machines, electric fans, and the like. Such materials are subject to repetitive stresses due to the driving force of motors. Accordingly, such interior and exterior materials should be able to withstand the repetitive stresses for a predetermined length of time or longer without cracking or breaking.

SAN resins with a high acrylonitrile content in the ABS resins or acrylate-styrene-acrylonitrile copolymers in the ABS resins can be used to reinforce the chemical resistance of ABS resins. ABS resin and polyester resin can also be alloyed to reinforce chemical resistance of the ABS resins, such as disclosed in Korean Patent No. 159256. However, because polyester resin is a crystalline resin, the polyester resin may not be filled completely since the fluidity of the polyester resin is not good if the mold temperature is not set to a high temperature of at least 80° C. during injection molding. Further, when the structure of a mold is complicated, there can be problems with the molding of the polyester resin if the molding temperature is not sufficiently high (the polyester resin may only be partially molded).

SUMMARY OF THE INVENTION

The present invention provides a high flow thermoplastic resin composition that can have excellent chemical resistance, impact resistance, gloss, and/or fluidity.

The present invention further provides a molded article, which is manufactured using the thermoplastic resin composition, and which can have excellent chemical resistance, impact resistance and/or gloss.

The thermoplastic resin composition of the invention includes a styrene-acrylonitrile copolymer resin including one or more functional groups capable of reacting with polyester, an acrylonitrile-butadiene-styrene copolymer resin with a low acrylonitrile content, and a polyester resin. In exemplary embodiments, the thermoplastic resin composition of the present invention which can have excellent impact resistance, chemical resistance, fluidity and/or high gloss, comprises about 1 to about 80 parts by weight of a styrene-acrylonitrile resin (A) including one or more functional groups capable of reacting with polyester; about 1 to about 98 parts by weight of an acrylonitrile-butadiene-styrene resin (B) comprising about 5 to about 40% by weight of a graft polymerized acrylonitrile-butadiene-styrene resin (B1) and about 60 to about 95% by weight of a styrene-acrylonitrile resin (B2) and including about 20% by weight or less of acrylonitrile; and about 1 to about 98 parts by weight of a polyester resin (C), wherein the total resin composition comprises about 1 to about 13% by weight of acrylonitrile.

The styrene-acrylonitrile resin (A) can include the functional group capable of reacting with polyester in an amount of about 0.01 to about 5.0 mole %.

The functional group capable of reacting with polyester may be derived from an unsaturated compound represented by the following Chemical Formula 1, maleic anhydride, maleic acid, or a combination thereof.

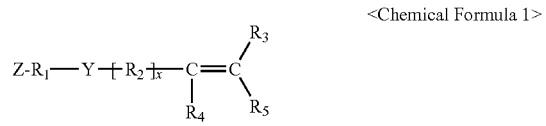

<Chemical Formula 1> wherein each of R3, R4 and R5 independently comprises H, saturated or unsaturated C1-C12 alkyl, C6-C14 aryl, or saturated or unsaturated C1-C12 alkyl-substituted C6-C14 aryl;

Y is ether (—O—), carboxyl (—O—[C=O]—, —[O=C]—O—), C1-C12 alkylene, C6-C14 arylene, or saturated or unsaturated C1-C12 alkyl-substituted C6-C14 arylene;

x is 0 or 1;

Z is epoxy, carboxylic acid, isocyanate, oxadiazole, amine, or hydroxy, wherein if Y is ether (—O—) or carboxyl (—O—[C=O]—, —[O=C]—O—), each R1 and R2 independently comprises C1-C12 alkylene, C6-C14 arylene, or saturated or unsaturated C1-C12 alkyl-substituted C6-C14 arylene, and if Y is C1-C12 alkylene or C6-C14 arylene or saturated or unsaturated C1-C12 alkyl-substituted C6-C14 arylene, Y is represented by (R1-Y—R2).

BRIEF DESCRIPTION OF THE DRAWING

FIG. 1 is a graph illustrating the test described in the examples for determining chemical resistance of a specimen to an organic solvent, in which "a" is the length (in mm) of a long axis of a measuring instrument, "b" is the length (in mm) of a short axis of a measuring instrument, and "x" is the cracking length (in mm) of a specimen from the short axis.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to the present invention comprises about 1 to about 80 parts by weight of a styrene-acrylonitrile resin (A) including one or more functional groups capable of reacting with polyester; about 1 to about 98 parts by weight of an acrylonitrile-butadiene-styrene resin (B) comprising about 5 to about 40% by weight of a graft polymerized acrylonitrile-butadiene-styrene resin (B1) and about 60 to about 95% by weight of a styrene-acrylonitrile resin (B2) and including about 20% by weight or less of acrylonitrile; and about 1 to about 98 parts by weight of a polyester resin (C), wherein the total resin composition comprises about 1 to about 13% by weight of acrylonitrile. The thermoplastic resin composition according to the present invention can have excellent impact resistance, chemical resistance and fluidity while maintaining high gloss properties.

The composition of the invention includes an alloy or combination of two resins to provide properties useful for structural materials. The composition of the invention can provide the ABS resin with excellent chemical or impact resistance and minimize the deterioration of the workability and impact resistance the polyester resin. Accordingly, the thermoplastic resin of the invention can exhibit chemical resistance and impact resistance and high gloss properties while maintaining excellent fluidity by using an ABS resin with a low acrylonitrile content and an SAN resin containing one or more functional groups capable of reacting with polyester.

Hereinafter, the respective components of the thermoplastic resin composition of the present invention will be described in detail.

(A) Styrene-acrylonitrile Resin Comprising Functional Group Capable of Reacting with Polyester The thermoplastic resin composition of the present invention includes the styrene-acrylonitrile resin comprising one or more functional groups capable of reacting with polyester in an amount of about 1 to about 80 parts by weight, based on the total weight of the thermoplastic resin composition. The styrene-acrylonitrile resin comprising one or more functional groups capable of reacting with polyester may be prepared by polymerizing a monomer mixture comprising about 0.01 to about 5.0 mole % of a monomer (A1) comprising one or more functional groups capable of reacting with polyester and about 99.99 to about 95 mole % of a vinyl-based monomer (A2) so that the functional group capable of reacting with polyester is present in the styrene-acrylonitrile resin.

(A1) Unsaturated Compound Comprising Functional Group Capable of Reacting, with Polyester The monomer comprising one or more functional groups capable of reacting with polyester may be an unsaturated compound, maleic anhydride, maleic acid, or a combination thereof. Exemplary unsaturated compounds may include without limitation epoxy group-comprising monomers such as epoxy alkyl acrylate, allyl glycidyl ester, aryl glycidyl ester, glycidyl methacrylate, glycidyl acrylate, butadiene monoxide, vinyl glycidyl ether, and glycidyl itaconate; carboxylic acid group-comprising monomers such as acrylic acid, methacrylic acid, 2-butanoic acid, 2-methyl-2-butanoic acid, undecylenic acid, oleic acid, sorbic acid, linoleic acid, crotonic acid, and itaconic acid; isocyanate group-comprising monomers such as vinyl isocyanate, acryl isocyanate, and methacryl isocyanate; amine group-comprising monomers such as vinyl amine, acryl amine, and methacryl amine; hydroxy group-comprising monomers such as hydroxy vinyl ether, hydroxy ethyl acrylate, hydroxy ethyl methacrylate, hydroxy propyl acrylate, hydroxy propyl methacrylate, 2-hydroxy acrylate, and 3-phenoxypropyl acrylate; and the like, and combinations thereof.

An exemplary monomer comprising one or more functional groups capable of reacting with polyester may be a compound represented by the following Chemical Formula 1:

<Chemical Formula 1>

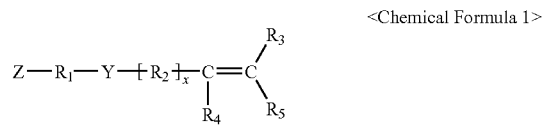

wherein each of R3, R4 and R5 independently comprises H, saturated or unsaturated C1-C12 alkyl, C6-C14 aryl, or saturated or unsaturated C1-C12 alkyl-substituted C6-C14 aryl;

Y is ether (—O—), carboxyl (—O—[C=O]—, —[O=C]—O—), C1-C12 alkylene, C6-C14 arylene, or C1-C12 alkyl-substituted C6-C14 arylene;

x is 0 or 1;

Z is epoxy, carboxylic acid, isocyanate, oxadiazole, amine, or hydroxy, wherein if Y is ether (—O—) or carboxyl (—O—[C=O]—, —[O=C]—O—), each R1 and R2 independently comprises C1-C12 alkylene, C6-C14 arylene, or saturated or unsaturated C1-C12 alkyl-substituted C6-C14 arylene, and if Y is C1-C12 alkylene or C6-C14 arylene or saturated or unsaturated C1-C12 alkyl-substituted C6-C14 arylene, Y is represented by (R1-Y—R2).

Exemplary unsaturated compounds may include without limitation: epoxy group-comprising monomers such as epoxy alkyl acrylate, allyl glycidyl ester, aryl glycidyl ester, glycidyl methacrylate, glycidyl acrylate, butadiene monoxide, vinyl glycidyl ether, and glycidyl itaconate; carboxylic acid group-comprising monomers such as acrylic acid, methacrylic acid, 2-butanoic acid, 2-methyl-2-butanoic acid, undecylenic acid, oleic acid, sorbic acid, linoleic acid, crotonic acid, and itaconic acid; isocyanate group-comprising monomers such as vinyl isocyanate, acryl isocyanate, and methacryl isocyanate; amine group-comprising monomers such as vinyl amine, acryl amine, and methacryl amine; hydroxy group-comprising monomers such as hydroxy vinyl ether, hydroxy ethyl acrylate, hydroxy ethyl methacrylate, hydroxy propyl acrylate, hydroxy propyl methacrylate, and 2-hydroxy acrylate, and 3-phenoxypropyl acrylate; and the like; and combinations thereof.

(A2) Vinyl-Based Monomer

Examples of the vinyl-based monomer may include without limitation vinyl aromatic monomers, vinyl cyanide monomers, and the like, and combinations thereof. For example, a mixture of about 99 to about 50% by weight of a vinyl aromatic monomer and about 1 to about 50% by weight of a vinyl cyanide monomer may be used as the vinyl-based monomer. Exemplary vinyl aromatic monomers may include without limitation styrene, para-t-butylstyrene, alpha-methylstyrene, beta-methylstyrene, para-methylstyrene, ethylstyrene, vinyl xylene, monochlorostyrene, dichlorostyrene, dibromostyrene, vinylnaphthalene, and the like, which may be used singly or in the form of combinations thereof.

The vinyl aromatic monomer may be a compound represented by the following Chemical Formula 2.

<Chemical Formula 2>

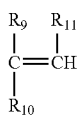

wherein R9 is hydrogen or methyl,

R10 is phenyl, halophenyl, C1-C8 alkylphenyl, C1-C8 alkylhalophenyl, naphthalene, or C1-C8 alkylnaphthalene, for example phenyl, and R11 is hydrogen or methyl.

The halophenyl is phenyl substituted with one to three halogen compounds, the C1-C8 alkylphenyl is phenyl substituted with one or two C1-C8 alkyl, the C1-C8 alkylhalophenyl is phenyl substituted with C1-C8 alkyl including one or more halogen compounds or phenyl substituted with halogen and C1-C8 alkyl, and the C1-C8 alkylnaphthalene is naphthalene substituted with one to four C1-C8 alkyl.

Exemplary vinyl cyanide compounds may include without limitation acrylonitrile, methacrylonitrile, ethacrylonitrile, and the like, and combinations thereof.

To improve the properties of a copolymer, an ethylenically unsaturated monomer (A2) may be used in an amount ranging from about 0 to about 30% by weight based on the vinyl-based monomer, in addition to the foregoing monomer(s). Exemplary ethylenically unsaturated monomers (A2) may include without limitation acrylic or methacrylic acid alkyl esters, such as C1-C4 alkyl acrylates or methacrylates, such as methyl methacrylate, aromatic group esters of acrylic or methacrylic acid such as phenyl acrylate, phenyl methacrylate, benzyl acrylate, benzyl methacrylate, 2-phenylethyl acrylate, 2-phenylethyl methacrylate, 2-phenoxyethyl acrylate, and 2-phenoxyethyl methacrylate; acrylic acid, methacrylic acid and dicarboxylic acid, such as maleic acid, fumaric acid, itaconic acid and anhydrides thereof; N-substituted maleimides, such as N-methylmaleimide, N-phenylmaleimide and N-cyclohexylmaleimide; nitrogen-functional monomers, such as dimethylaminoethyl acrylate, diethylaminoethyl acrylate, vinylimidazole, vinylpyrrolidone, vinyl caprolactam, vinylcarbazole, vinylaniline, acrylamide, and methacrylamide; and the like, and combinations thereof.

(B) Acrylonitrile-butadiene-styrene Resin

A resin polymerized by adding a vinyl aromatic monomer, a cyanide vinyl monomer, and optionally a monomer capable of copolymerizing with the vinyl-based monomers to a rubber phase polymer may be used as the acrylonitrile-butadiene-styrene resin of the resin composition according to the present invention. Such acrylonitrile-butadiene-styrene resin may be prepared by known polymerization methods including emulsion polymerization, suspension polymerization, and bulk polymerization. The acrylonitrile-butadiene-styrene resin can be prepared, for example, by mixing and extruding a graft polymerized acrylonitrile-butadiene-styrene resin (hereinafter, referred to as "g-ABS") and a styrene-acrylonitrile copolymer (hereinafter referred to as "SAN"). In case of bulk polymerization, the ABS resin can be prepared by a one step reaction process without separately preparing the g-ABS or SAN. Regardless of the polymerization method used, the g-ABS content in the final acrylonitrile-butadiene-styrene resin (B) is about 5 to about 40% by weight, based on the total weight of the acrylonitrile-butadiene-styrene resin (B), and the acrylonitrile content in the acrylonitrile-butadiene-styrene resin (B) is about 20% by weight or less, for example about 1 to about 15% by weight, based on the total weight of the acrylonitrile-butadiene-styrene resin (B). Further, the total amount of acrylonitrile contained in the thermoplastic resin composition of the present invention is for example about 13% by weight or less, for example about 1 to about 11% by weight, based on the total weight of the thermoplastic resin composition.

The acrylonitrile-butadiene-styrene resin (B) used in the present invention may be prepared with g-ABS and SAN at a proper content ratio, and g-ABS and SAN are for example mixed based on the compatibility thereof.

The thermoplastic resin composition according to the present invention can include the acrylonitrile-butadiene-styrene resin (B) in an amount of about 1 to about 98 parts by weight, based on the total weight of the thermoplastic resin composition.

(B1) Graft-Polymerized acrylonitrile-butadiene-styrene Resin (g-ABS Resin)

A graft-polymerized acrylonitrile-butadiene-styrene resin of the present invention is obtained by graft polymerizing a rubber phase polymer, a vinyl aromatic monomer, a vinyl cyanide monomer, and a monomer imparting workability and heat resistance and being capable of copolymerizing with the vinyl-based monomers. Examples of a rubber phase polymer that can be used in the graft-polymerized acrylonitrile-butadiene-styrene resin (g-ABS resin) of the present invention may is include without limitation diene-based rubbers, such as polybutadiene-based rubbers, poly(styrene-butadiene)-based rubbers, and poly(acrylonitrile-butadiene)-based rubbers, saturated rubbers in which hydrogen is added in the diene-based rubbers, isoprene rubbers, acrylic rubbers, such as polybutyl acrylate, ethylene-propylene-diene terpolymer (EPDM), and the like, and combinations thereof. The graft copolymer (g-ABS) resin can include the rubber phase polymer in an amount of about 5 to about 65 parts by weight, based on the total weight of the graft copolymer (g-ABS) resin.

Exemplary vinyl aromatic monomers can include without limitation styrene, α-methylstyrene, p-methylstyrene and the like, and combinations thereof. The graft copolymer (g-ABS) resin can include the vinyl aromatic monomer graft-copolymerized in an amount of about 94 to about 34 parts by weight, based on the total weight of the graft copolymer (g-ABS) resin.

Exemplary vinyl cyanide monomers can include without limitation acrylonitrile, methacrylonitrile, and the like, and combinations thereof. The graft copolymer (g-ABS) resin can include the vinyl cyanide monomer graft-copolymerized in an amount of about 1 to about 30 parts by weight, based on the total weight of the graft copolymer (g-ABS) resin.

Further, a monomer for imparting workability and heat resistance can be added in the graft-copolymerization. Exemplary monomers capable of imparting workability and heat resistance may include without limitation acrylic acid, methacrylic acid, maleic anhydride, N-substituted maleimide, and the like, and combinations thereof. The graft copolymer (g-ABS) resin can include the added monomer in an amount of about 0 to about 15 parts by weight, based on the total weight of the graft copolymer (g-ABS) resin.

When preparing a g-ABS resin of the present invention, the rubber particles can have an average particle size of about 0.1 to about 4 μm taking into account the impact strength and external appearance thereof.

The Z-average particle size of a rubber phase for exhibiting proper physical properties in the alloying of an acrylonitrile-butadiene-styrene resin and a polyester resin can be about 0.1 to about 6.0 μm, for example about 0.25 to about 3.5 μm.

(B2) Styrene-acrylonitrile Resin (SAN Resin)

A styrene-acrylonitrile resin used in the present invention can be prepared according to the ratio and compatibility of the monomers excluding the rubber in the graft-polymerized acrylonitrile-butadiene-styrene resin (B1). The styrene-acrylonitrile resin can be prepared by adding and copolymerizing a vinyl aromatic monomer, a vinyl cyanide monomer, and a monomer for imparting workability and heat resistance and being capable of copolymerizing with the vinyl-based monomers. Exemplary vinyl aromatic monomers can include without limitation styrene, α-methylstyrene, p-methylstyrene and the like, and combinations thereof. The styrene-acrylonitrile resin can include the vinyl aromatic monomer in an amount of about 70 to about 95% by weight, based on the total weight of the styrene-acrylonitrile resin.

Exemplary vinyl cyanide monomers can include without limitation acrylonitrile, methacrylonitrile, and the like, and combinations thereof. The styrene-acrylonitrile resin can include the vinyl cyanide monomer in an amount of about 30 to about 5% by weight, based on the total weight of the styrene-acrylonitrile resin.

A styrene-acrylonitrile resin of the present invention may further comprise a monomer for imparting properties such as workability and heat resistance. Exemplary monomers capable of imparting workability and heat resistance may include without limitation acrylic acid, methacrylic acid, maleic anhydride, N-substituted maleimide, and the like, and combinations thereof. The styrene-acrylonitrile resin can include the monomer for imparting workability and heat resistance in an amount of about 0 to about 30% by weight, based on the total weight of the styrene-acrylonitrile resin.

The acrylonitrile-butadiene-styrene resin (B) used in the present invention may be obtained by mixing about 5 to about 40% by weight of the graft-polymerized acrylonitrile-butadiene-styrene resin (B1) and about 60 to about 95% by weight of the styrene-acrylonitrile resin (B2).

The acrylonitrile-butadiene-styrene resin (B) for example comprises about 20% by weight or less, for example about 1 to about 13% by weight, of acrylonitrile.

(C) Polyester

The thermoplastic resin composition according to the present invention can include a polyester resin or copolymer thereof in an amount of about 1 to about 98 parts by weight, based on the total weight of the thermoplastic resin composition. The polyester resins used can vary, depending on their intrinsic viscosities. For instance, the polyester resins can have an intrinsic viscosity of about 0.3 to about 1.15 g/dL.

The polyester resins may be obtained by polycondensation reaction of aromatic dicarboxylates, in which acids including terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid are substituted with dimethyl groups, such as dimethyl terephthalate (DMT), dimethyl isophthalate, alkyl ester of naphthalene dicarboxylic acid, dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, dimethyl-2,7-naphthalate or combinations thereof;

with diols, such as C2-C12 ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like, and combinations thereof.

Inorganic particles may be added to the polyester resins according to uses thereof. For instance, titanium dioxide ($TiO_2$), silicon dioxide ($SiO_2$), aluminum hydroxide ($Al(OH)_2$) and the like may be used as the inorganic particles. The inorganic particles can be used in an amount of about 0 to about 30% by weight in the polyester resin.

The thermoplastic resin composition of the present invention may further comprise one or more additives such as a heat stabilizer, release agent, dispersant, anti-dripping agent, weather stabilizer, inorganic filler, inorganic fiber, and the like, and a combination thereof.

The present invention is illustrated by the following examples. The following examples are only for illustrative purposes and are not construed as being limiting or restrictive of the scope of the present invention.

EXAMPLES

Preparation Examples

The specifications of the various components and additives used in the Examples of the present invention and the Comparative Examples are as follows.

(A) SAN Resins Comprising Functional Group Capable of Reacting with Polyester (A1) Epoxy-Comprising SAN Resin (GMA 1.0%-SAN)

An epoxy-comprising styrene-acrylonitrile copolymer resin (GMA-SAN) is prepared by adding about 0.2 part by weight of azobisisobutyronitrile, about 0.4 part by weight of tricalcium phosphate and about 0.2 part by weight of a mercaptan-based chain transfer agent to a mixture of about 120 parts by weight of deionized water and about 100 parts by weight of a monomer mixture comprising about 1.0% by mole of glycidyl methacrylate and about 99.9% by mole of a vinyl-based compound comprising about 85 parts by weight of styrene and about 15 parts by weight of acrylonitrile, heating the resulting mixture from room temperature to about 80° C. for about 60 minutes, and then, maintaining the resulting mixture at the temperature of about 80° C. for about 180 minutes. The prepared epoxy-comprising styrene-acrylonitrile copolymer resin is washed, dehydrated and dried to prepare a powdery epoxy-comprising styrene-acrylonitrile copolymer resin (GMA-SAN).

(A2) Carboxyl Group-Comprising Styrene-Based Resin (MAA 1.0%-SAN)

A carboxyl group-comprising styrene-acrylonitrile copolymer resin (MMA-SAN) is prepared by adding about 0.2 part by weight of azobisisobutyronitrile, about 0.4 part by weight of tricalcium phosphate and about 0.2 part by weight of a mercaptan-based chain transfer agent to a mixture of about 120 parts by weight of deionized water and about 100 parts by weight of a monomer mixture comprising about 1.0% by mole of methacrylic acid and about 99.0% by mole of a vinyl-based compound (B2) comprising about 85 parts by weight of styrene and about 15 parts by weight of acrylonitrile, heating the resulting mixture from room temperature to about 80° C. for about 60 minutes, and then, maintaining the resulting mixture at the temperature of about 80° C. for about 180 minutes. The prepared carboxyl group-comprising styrene-acrylonitrile copolymer resin is washed, dehydrated and dried to prepare a powdery carboxyl group-comprising styrene-acrylonitrile copolymer resin (MMA-SAN).

(A3) Maleic Anhydride-Comprising Styrene Based Resin (MA 1.0%-SAN)

A maleic anhydride-comprising styrene-acrylonitrile copolymer resin (MA-SAN) is prepared by adding about 0.2 part by weight of azobisisobutyronitrile, about 0.4 part by weight of tricalcium phosphate and about 0.2 part by weight of a mercaptan-based chain transfer agent to a mixture of about 120 parts by weight of deionized water and about 100 parts by weight of a monomer mixture comprising about 1.0% by mole of maleic anhydride and about 99.0% by mole of a vinyl-based compound (B2) comprising about 85 parts by weight of styrene and about 15 parts by weight of acrylonitrile, heating the resulting mixture from room temperature to about 80° C. for about 60 minutes, and then, maintaining the resulting mixture at the temperature of about 80° C. for about 180 minutes. The prepared maleic anhydride-comprising styrene-acrylonitrile copolymer resin is washed, dehydrated and dried to prepare a powdery maleic anhydride-comprising styrene-acrylonitrile copolymer resin (MA-SAN).

(B) ABS Resin (B1) g-ABS Resin

A graft copolymer (g-ABS) latex is prepared by preparing a mixture of about 50 parts by weight of the solid content of butadiene rubber latex, about 36 parts by weight of styrene, about 14 parts by weight of acrylonitrile as a graft copolymerizable monomer, and about 150 parts by weight of deionized water, adding to the mixture about 1.0 part by weight of potassium oleate, about 0.4 part by weight of cumene hydroperoxide, about 0.2 part by weight of a mercaptan-based chain transfer agent, about 0.4 part by weight of glucose, about 0.01 part by weight of ferric sulfate hydrate, and about 0.3 part by weight of sodium pyrophosphate with respect to the total solid content of the mixture, and then, maintaining the resulting mixture to about 75° C. for five hours to complete the reaction. A powdery graft copolymer resin (g-ABS) is prepared by adding about 0.4 part by weight of sulfuric acid with respect to the solid content of the resulting resin composition thereto and by solidifying the mixture.

(B21) SAN resin (AN 10%-SAN)

A styrene-acrylonitrile copolymer resin (SAN resin) is prepared by adding about 0.2 part by weight of azobisisobutyronitrile, about 0.4 part by weight of tricalcium phosphate, and about 0.2 part by weight of a mercaptan-based chain transfer agent as required additives to a mixture of about 90 parts by weight of styrene, about 10 parts by weight of acrylonitrile, and about 120 parts by weight of deionized water, heating the resulting mixture from room temperature to about 80° C. for about 90 minutes, and then, maintaining the resulting mixture at the temperature of about 80° C. for about 180 minutes. The prepared styrene-acrylonitrile copolymer resin is washed, dehydrated and dried to prepare a powdery styrene-acrylonitrile copolymer resin (SAN resin).

(B22) SAN Resin (AN 15%-SAN)

A styrene-acrylonitrile copolymer resin (SAN resin) is prepared by adding about 0.2 part by weight of azobisisobutyronitrile, about 0.4 part by weight of tricalcium phosphate, and about 0.2 part by weight of a mercaptan-based chain transfer agent as required additives to a mixture of about 85 parts by weight of styrene, about 15 parts by weight of acrylonitrile, and about 120 parts by weight of deionized water, heating the resulting mixture from room temperature to about 80° C. for about 90 minutes, and then, maintaining the resulting mixture at the temperature of about 80° C. for about 180 minutes. The prepared styrene-acrylonitrile copolymer resin is washed, dehydrated and dried to prepare a powdery styrene-acrylonitrile copolymer resin (SAN resin).

(B23) SAN Resin (AN 30%-SAN)

A styrene-acrylonitrile copolymer resin (SAN resin) is prepared by adding about 0.2 part by weight of azobisisobutyronitrile, about 0.4 part by weight of tricalcium phosphate, and about 0.2 part by weight of a mercaptan-based chain transfer agent as required additives to a mixture of about 70 parts by weight of styrene, about 30 parts by weight of acrylonitrile, and about 120 parts by weight of deionized water, heating the resulting mixture from room temperature to about 80° C. for about 90 minutes, and then, maintaining the resulting mixture at the temperature of about 80° C. for about 180 minutes. The prepared styrene-acrylonitrile copolymer resin is washed, dehydrated and dried to prepare a powdery styrene-acrylonitrile copolymer resin (SAN resin).

(C) Polyester

As a polyester resin (C1) with an intrinsic viscosity of about 0.76 g/dL, an A1100 product manufactured by Anychem Corporation is used in Examples of the present invention.

As a recycled polyester resin (C2) with an intrinsic viscosity of about 0.72 g/dL, a Clear PET Flake product manufactured by Samyang Corporation is used in Examples of the present invention.

As a polyester resin (C3) with an intrinsic viscosity of about 0.65 g/dL, a PET SD product manufactured by Huvis Corporation is used in Examples of the present invention.

The physical properties of specimens of the compositions are measured by the following methods.

A) Impact strength: Impact strength of specimens is measured with the specimens notched in accordance with ASTM D256. An average of five test results is calculated as a final test result.

B) Gloss: Gloss of specimens is measured at an angle of about 60 degrees in accordance with ASTM D523.

C) Evaluation of melt flow index (MI): Melt flow index of the resins is measured according to ASTM D1238, under a load of about 10 kg at about 250° C. after drying resins at about 100° C. for about four hours.

D) Evaluation of fluidity in mold: Length (mm) of injection molded articles is measured after injecting resins using a 6 oz injection molding machine and a spiral mold under conditions of a molding temperature of about 230° C., a mold temperature of about 60° C., an injection pressure of about 50%, and an injection rate of about 70%.

E) Chemical resistance: In order to evaluate chemical resistance to an organic solvent, cracking strain is obtained using Expression 1 from the cracking degree generated after mounting test specimens with dimensions of about 200 mm×about 50 mm×about 2 mm (width×length×height) on ¼ oval jigs as illustrated in FIG. 1, coating the test specimens with an organic solvent, and allowing about 24 hours to pass.

$$\epsilon = (b \cdot t)/2a^2 \times (1 - x^2(a^2 - b^2)/a^4)^{-3/2} \times 100(\%) \quad \text{[Expression 1]}$$

wherein:

$\epsilon$: Cracking strain (%)

a: Length (mm) of major axis of measuring instrument b: Length (mm) of minor axis of measuring instrument t: Thickness (mm) of specimen x: Cracking length (mm) from minor axis Examples of the organic solvents used include "Magic Clean" manufactured by Kao Corporation of Japan as an alkaline detergent, "Sunpole" manufactured by Dainihon Jochugiku Co., Ltd. of Japan as an acidic detergent, Brake Oil DOT4 manufactured by BOSCH as industrial oil, Phytoncide undiluted solution as an aromatic, and "Salad Oil" manufactured by Nissin Food Products Co., Ltd. of Japan as edible oil.

F) Content of AN: The content of acrylonitrile (AN) is measured using an elemental analyzer (Flash EA 1112). After collecting about 2.0 mg of samples and pre-treating them, AN content of the samples is measured at a temperature of about 900° C. using an NCHS column.

Example 1

After adding about 0.3 part by weight of a hydroxyphenyl-based heat stabilizer to 100 parts by weight of a resin mixture including about 20 parts by weight of an epoxy-comprising SAN resin (A 1), about 25 parts by weight of a g-ABS resin (B1), about 25 parts by weight of an SAN resin (B21), and about 30 parts by weight of polyester (C1), the resin mixture and hydroxyphenyl-based heat stabilizer are uniformly mixed in a Henschel mixer for about 3 to about 10 minutes. The mixture is extruded at an extrusion temperature of about 180 to about 280° C., a screw rotational speed of about 150 to about 300 rpm, and a composition feed rate of about 30 to about 60 kg/hr in an ordinary twin screw extruder to manufacture pellets. Samples are manufactured by injecting the pellets under conditions of a molding temperature of about 180 to about 280° C. and a mold temperature of about 40 to about 80° C. in a 6 oz injection molding machine after drying the manufactured pellets at about 80° C. for about 3 hours. After leaving the manufactured samples at a temperature of about 23° C. and a relative humidity of about 50% for about 40 hours, physical properties and chemical resistance of the samples are measured.

Examples 2 to 9 and Comparative Examples 1 to 7

Samples are manufactured in the same manner as in Example 1 except that an epoxy-comprising SAN resin (A), an ABS resin (B), and polyester (C) are mixed according to ratios represented in the following Tables 1 and 2.

TABLE 1

| Composition | Mark | Example 1 | Example 2 | Example 3 | Example 4 | Example 5 | Example 6 | Example 7 | Example 8 | Example 9 |
|---|---|---|---|---|---|---|---|---|---|---|
| Epoxy-comprising SAN resin (A) | A1 | 20 | | | 20 | 10 | 20 | 20 | 20 | 30 |
| | A2 | | 20 | | | | | | | |
| | A3 | | | 20 | | | | | | |
| ABS resin (B) | B1 | 25 | 25 | 25 | 25 | 25 | 20 | 25 | 25 | 20 |
| | B21 | 25 | 25 | 25 | | 55 | 10 | 25 | 25 | 10 |
| | B22 | | | | 25 | | | | | |
| | B23 | | | | | | | | | |
| Polyester (C) | C1 | 30 | 30 | 30 | 30 | 10 | 50 | | | 40 |
| | C2 | | | | | | | 30 | | |
| | C3 | | | | | | | | 30 | |
| Heat stabilizer | | 0.3 | 0.3 | 0.3 | 0.3 | 0.3 | 0.3 | 0.3 | 0.3 | 0.3 |
| Impact strength (1/8" kgf·cm/cm) | | 41 | 45 | 43 | 48 | 35 | 58 | 40 | 38 | 53 |
| Gloss (60 degrees) | | 98 | 97 | 96 | 96 | 98 | 97 | 98 | 98 | 96 |
| Melt flow index (g/10 min) | | 45 | 40 | 42 | 38 | 67 | 32 | 44 | 52 | 35 |
| Evaluation of fluidity within mold (mm) | | 310 | 305 | 310 | 290 | 370 | 270 | 310 | 340 | 280 |
| Chemical Resistance | Alkaline detergent | NC | NC | NC | NC | 2.2 | NC | NC | NC | NC |
| | Acidic Detergent | NC | NC | NC | NC | 2.1 | NC | NC | NC | NC |
| | Industrial oil | 1.5 | 1.6 | 1.5 | 1.8 | 1.3 | 2.0 | 1.5 | 1.4 | 1.9 |
| | Aromatic | 1.7 | 1.7 | 1.7 | 2.0 | 1.5 | 2.2 | 1.7 | 1.6 | 2.2 |
| | Edible oil | NC | NC | NC | NC | NC | NC | NC | NC | NC |
| Content (%) of AN | | 8.7 | 8.8 | 8.7 | 10.1 | 10.4 | 6.6 | 8.7 | 8.8 | 8.1 |

NC: No cracks

TABLE 2

| Composition | Mark | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Epoxy-comprising SAN resin (A) | A1 | | | | | 20 | | | |
| | A2 | | | | | | 20 | | |
| | A3 | | | | | | | 20 | |
| ABS resin (B) | B1 | 25 | 25 | 25 | 40 | 25 | 25 | 25 | 30 |
| | B21 | 75 | | | | | | | |
| | B22 | | 75 | | | | | | |
| | B23 | | | 75 | 60 | 25 | 25 | 25 | 40 |
| Polyester (C) | C1 | | | | | 30 | 30 | 30 | 30 |
| | C2 | | | | | | | | |
| | C3 | | | | | | | | |
| Heat stabilizer | | 0.3 | 0.3 | 0.3 | 0.3 | 0.3 | 0.3 | 0.3 | 0.3 |
| Impact strength (1/8" kgf·cm/cm) | | 17 | 18 | 27 | 38 | 48 | 49 | 46 | 15 |
| Gloss (60 degrees) | | 97 | 95 | 95 | 91 | 94 | 93 | 94 | 93 |
| Melt flow index (g/10 min) | | 72 | 67 | 58 | 51 | 22 | 21 | 23 | 35 |
| Evaluation of fluidity within mold (mm) | | 450 | 410 | 380 | 340 | 240 | 240 | 240 | 280 |
| Chemical Resistance | Alkaline detergent | 0.8 | 0.9 | 1.0 | 1.8 | NC | NC | NC | 1.9 |
| | Acidic detergent | 0.8 | 0.8 | 1.0 | 1.7 | NC | NC | NC | 1.8 |
| | Industrial | 0.3 | 0.3 | 0.5 | 0.9 | 2.0 | 2.0 | 2.0 | 1.1 |

TABLE 2-continued

| Composition | Mark | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | oil | | | | | | | | |
| | Aromatic | 0.5 | 0.5 | 0.7 | 1.0 | 2.2 | 2.3 | 2.2 | 1.3 |
| | Edible oil | 0.9 | 0.9 | 1.2 | 1.9 | NC | NC | NC | NC |
| Content (%) of AN | | 10.8 | 14.5 | 25.5 | 23.3 | 13.8 | 13.7 | 13.8 | 15.9 |

NC: No cracks

A thermoplastic resin composition according to the present invention can have excellent chemical resistance, impact resistance and gloss, and high fluidity by combining an SAN resin having an epoxy group, an ABS resin having a low acrylonitrile content, and a polyester resin.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition that can have impact resistance, chemical resistance, fluidity and gloss, comprising:
    (A) about 1 to about 80 parts by weight of a styrene-acrylonitrile resin including one or more functional groups capable of reacting with polyester;
    (B) 30 to about 98 parts by weight of an acrylonitrile-butadiene-styrene resin comprising (B1) about 5 to about 40% by weight of a graft polymerized acrylonitrile-butadiene-styrene resin and (B2) about 60 to about 95% by weight of a styrene-acrylonitrile resin and including about 20% by weight or less of acrylonitrile; and
    (C) about 1 to about 98 parts by weight of a polyester resin, wherein the resin composition comprises a total amount of acrylonitrile of about 1 to about 11% by weight, and wherein the composition has a melt flow index of 32 g/10 min. to 67 g/10 min. measured in accordance with ASTM D1238.

2. The thermoplastic resin composition that can have impact resistance, chemical resistance, fluidity and gloss of claim 1, wherein said styrene-acrylonitrile resin (A) includes about 0.01 to about 5.0 mole % of the functional group capable of reacting with polyester.

3. The thermoplastic resin composition that can have impact resistance, chemical resistance, fluidity and gloss of claim 1, wherein said functional group capable of reacting with polyester is derived from an unsaturated compound represented by the following Chemical Formula 1, maleic anhydride, maleic acid, or a combination thereof

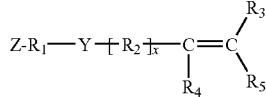

<Chemical Formula 1> wherein each of R3, R4 and R5 independently comprises H, saturated or unsaturated C1-C12 alkyl, C6-C14 aryl, or saturated or unsaturated C1-C12 alkyl-substituted C6-C14 aryl;
Y is ether (—O—), carboxyl (—O—[C=O]—, —[O=C]—O—), C1-C12 alkylene, C6-C14 arylene, or saturated or unsaturated C1-C12 alkyl-substituted C6-C14 arylene;
x is 0 or 1;
Z is epoxy, carboxylic acid, isocyanate, oxadiazole, amine, or hydroxy,
wherein if Y is ether (—O—) or carboxyl (—O—[C=O]—, —[O=C]—O—), each R1 and R2 independently comprises C1-C12 alkylene, C6-C14 arylene, or saturated or unsaturated C1-C12 alkyl-substituted C6-C14 arylene,
and if Y is C1-C12 alkylene or C6-C14 arylene or saturated or unsaturated C1-C12 alkyl-substituted C6-C14 arylene, Y is represented by (R1-Y—R2).

4. The thermoplastic resin composition that can have impact resistance, chemical resistance, fluidity and gloss of claim 3, wherein said unsaturated compound represented by the Chemical Formula 1 comprises epoxy alkyl acrylate, allyl glycidyl ester, aryl glycidyl ester, glycidyl methacrylate, glycidyl acrylate, butadiene monoxide, vinyl glycidyl ether, glycidyl itaconate, acrylic acid, methacrylic acid, 2-butanoic acid, 2-methyl-2-butanoic acid, undecylenic acid, oleic acid, sorbic acid, linoleic acid, crotonic acid, itaconic acid, vinyl isocyanate, acryl isocyanate, methacryl isocyanate, vinyl amine, acryl amine, methacryl amine, hydroxy vinyl ether, hydroxy ethyl acrylate, hydroxy ethyl methacrylate, hydroxy propyl acrylate, hydroxy propyl methacrylate, 2-hydroxy acrylate, 3-phenoxypropyl acrylate, or a combination thereof.

5. The thermoplastic resin composition that can have impact resistance, chemical resistance, fluidity and gloss of claim 1, further comprising one or more additives comprising a heat stabilizer, release agent, dispersant, anti-dripping agent, weather stabilizer, inorganic filler, inorganic fiber, or a combination thereof 6. A molded article produced from the thermoplastic resin composition as defined in claim 1.

7. The thermoplastic resin composition that can have impact resistance, chemical resistance, fluidity and gloss of claim 1, wherein the composition has an impact strength of 38 to 58 kgf·cm/cm measured in accordance with ASTM D256 and a gloss of 96 to 98 degrees measured in accordance with ASTM D523.

8. The thermoplastic resin composition that can have impact resistance, chemical resistance, fluidity and gloss of claim 1, wherein the length of an injection molded article formed of the composition is 270 to 370 mm, measured after injecting the composition using a 6 oz injection molding machine and a spiral mold at a molding temperature of about 230° C., a mold temperature of about 60° C., an injection pressure of about 50%, and an injection rate of about 70%.

* * * * *